US012090595B2

(12) United States Patent
Chen et al.

(10) Patent No.: US 12,090,595 B2
(45) Date of Patent: Sep. 17, 2024

(54) HORIZONTAL FIVE-AXIS PLATE CONVERSION MACHINING CENTER

(71) Applicant: KEDE NUMERICAL CONTROL CO., LTD., Liaoning (CN)

(72) Inventors: Hu Chen, Liaoning (CN); Yanxing Hou, Liaoning (CN); Chuansi Zhang, Liaoning (CN); Tinghui Liu, Liaoning (CN); Chunhong Fan, Liaoning (CN); Dongmei Shi, Liaoning (CN); Lixin Zhao, Liaoning (CN); Kuo Wang, Liaoning (CN); Hui Zhong, Liaoning (CN); Huiqiang Duan, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 455 days.

(21) Appl. No.: 17/600,953

(22) PCT Filed: Apr. 3, 2020

(86) PCT No.: PCT/CN2020/083274
§ 371 (c)(1),
(2) Date: Oct. 1, 2021

(87) PCT Pub. No.: WO2020/207353
PCT Pub. Date: Oct. 15, 2020

(65) Prior Publication Data
US 2022/0176475 A1    Jun. 9, 2022

(30) Foreign Application Priority Data

Apr. 8, 2019    (CN) .......................... 201910277370.2

(51) Int. Cl.
*B23Q 3/157*        (2006.01)
*B23C 9/00*         (2006.01)
(Continued)

(52) U.S. Cl.
CPC ................ *B23Q 3/157* (2013.01); *B23C 9/00* (2013.01); *B23Q 1/66* (2013.01); *B23Q 7/1431* (2013.01);
(Continued)

(58) Field of Classification Search
CPC .......... B23Q 1/56; B23Q 1/66; B23Q 7/1426; B23Q 7/1431; B23Q 7/1442; B23Q 3/157;
(Continued)

(56) References Cited

U.S. PATENT DOCUMENTS 5,564,483 A * 10/1996 Sacchi ...................... B23Q 1/03
                                                       144/286.5
6,786,686 B1 * 9/2004 Koike .................. B23Q 7/1431
                                                       409/137
(Continued)

FOREIGN PATENT DOCUMENTS

CN        204295296 U      4/2015
CN        109262031 A      1/2019
(Continued)

OTHER PUBLICATIONS

EPO Machine Translation of CN204295296U—Ren et al.; "A Turning Horizontal Machining Center"; Apr. 29, 2015.*

*Primary Examiner* — Erica E Cadugan
*Assistant Examiner* — Michael Vitale
(74) *Attorney, Agent, or Firm* — Muncy, Geissler, Olds & Lowe, P.C.

(57) ABSTRACT

A horizontal five-axis turning plate type machining center includes a support base, a lathe bed arranged on the support base and a column arranged on the support base, wherein the lathe bed and the column are fixedly connected through a connecting arm, a turning plate device is arranged on the support base, an X-direction sliding plate capable of sliding
(Continued)

in an X direction on the lathe bed is arranged on a side, facing the column, of the lathe bed, and a third driving unit capable of driving a workbench to perform position conversion between a turning plate and the X-direction sliding plate is arranged on the turning plate.

6 Claims, 10 Drawing Sheets

(51) Int. Cl.
  *B23Q 1/66* (2006.01)
  *B23Q 7/14* (2006.01)
(52) U.S. Cl.
  CPC . *B65D 2519/00781* (2013.01); *Y10T 29/5196* (2015.01); *Y10T 409/30532* (2015.01); *Y10T 409/306048* (2015.01); *Y10T 409/30896* (2015.01)
(58) Field of Classification Search
  CPC ......... Y10T 29/5126; Y10T 409/30532; Y10T 409/305824; Y10T 409/306048; Y10T 409/30896; Y10T 483/1733; B65D 2519/00781
  USPC ................ 29/33 P; 409/159, 168, 172, 224; 108/57.15; 483/30
  See application file for complete search history.

(56) References Cited

U.S. PATENT DOCUMENTS

| | | | | |
|---|---|---|---|---|
| 7,509,718 | B1 * | 3/2009 | Mischler | B23Q 1/015 29/33 P |
| 7,547,270 | B1 * | 6/2009 | Mischler | B23Q 3/15766 409/134 |
| 8,662,802 | B2 * | 3/2014 | Mischler | B23Q 1/015 408/234 |
| 2003/0146066 | A1 * | 8/2003 | Ashton | B65G 49/063 198/346.2 |
| 2006/0130311 | A1 * | 6/2006 | Kikuchi | B23Q 7/02 29/563 |
| 2006/0260907 | A1 * | 11/2006 | Ota | B23Q 1/66 198/346.1 |
| 2007/0274797 | A1 * | 11/2007 | Panczuk | B23Q 1/626 409/131 |
| 2009/0252581 | A1 * | 10/2009 | Mischler | B25B 11/005 414/222.05 |
| 2009/0252587 | A1 * | 10/2009 | Mischler | B66F 7/22 414/704 |
| 2017/0297157 | A1 * | 10/2017 | Podiebrad | B23Q 7/1431 |

FOREIGN PATENT DOCUMENTS

| | | | | |
|---|---|---|---|---|
| CN | 109262032 A | | 1/2019 | |
| CN | 110039095 A | | 7/2019 | |
| DE | 19645324 A1 * | | 5/1998 | ............. B23Q 1/015 |
| FR | 2972951 A1 * | | 9/2012 | ............... B23Q 1/66 |

* cited by examiner

HORIZONTAL FIVE-AXIS PLATE CONVERSION MACHINING CENTER

BACKGROUND OF THE INVENTION

1. Technical Field

The invention relates to the technical field of whole structures of machine tools, in particular to a horizontal five-axis turning plate type machining center.

2. Description of Related Art

With the rapid development of China's aviation industry, various plate cavity parts need to be machined. In order to improve the machining efficiency and precision, most machine tools adopt a way that a workpiece is vertically clamped at a machining station, and a milling cutter is horizontally mounted on a spindle of the machine tool. At present, for a horizontal five-axis machining center, the workpiece is directly loaded at the machining station, which is not easy to realize. Especially, for the machining of aeroengine structural parts with large cutting removal rates, the production efficiency will be greatly reduced. Therefore, the requirement of China's aerospace industry for equipment for high-efficiency and high-precision machining of aluminum alloy parts is hardly met.

BRIEF SUMMARY OF THE INVENTION

In view of the above problems, the invention discloses a horizontal five-axis turning plate type machining center based on research and design. The technical solution provided by the invention is as follows:

A horizontal five-axis turning plate type machining center comprises a support base, a lathe bed arranged on the support base and a column arranged on the support base, wherein the lathe bed and the column are fixedly connected through a connecting arm, the support base is provided with a turning plate device which comprises a turning plate having a lower part hinged to the support base and a first driving unit capable of driving the turning plate to turn over, and an X-direction sliding plate capable of sliding in an X direction on the lathe bed and a second driving unit capable of driving the X-direction sliding plate to slide are arranged on a side, facing the column, of the lathe bed; and a third driving unit capable of driving a workbench to perform position conversion between the turning plate and the X-direction sliding plate is arranged on the turning plate, the X-direction sliding plate is provided with a locking mechanism capable of locking the workbench, the column is provided with a Y-direction sliding plate, the Y-direction sliding plate is provided with a Z-direction ram, and the Z-direction ram is provided with a milling head.

Further, the lower part of the turning plate is provided with a first supporting slideway, a lower part of the X-direction sliding plate is provided with a second supporting slideway, a lower part of a back of the workbench is provided with sliding rollers capable of sliding on the first supporting slideway and the second supporting slideway, and an upper part of the workbench is provided with a limiting chute; and an upper part of the turning plate is provided with a first limiting roller, the first limiting roller is capable of entering the limiting chute and sliding relative to the limiting chute, and limiting the workbench on the turning plate, and an upper part of the X-direction sliding plate is provided with a second limiting roller capable of entering the limiting chute and sliding relative to the limiting chute, and limiting the workbench on the X-direction sliding plate.

Further, the first driving unit comprises a turning plate lead screw hinged to the support base and a turning plate driving motor for driving the turning plate lead screw to rotate, and a lead screw nut matched with the turning plate lead screw is arranged on an end face of the turning plate.

Further, the second driving unit comprises a rack fixed on the lathe bed in the X direction, a gear mounted on the X-direction sliding plate and a motor for driving the gear, and the gear meshes with the rack.

Further, the third driving unit comprises a worm and a motor for driving the worm, an axial direction of the worm is arranged in the X direction, pin rollers are arranged on the back of the workbench in the X direction at intervals, and the pin rollers are matched with the worm, so that when the worm rotates, the pin rollers are pushed to move so as to drive the workbench to move.

Further, the locking mechanism comprises a T-shaped block, a supporting block, a pull rod, a disc spring, a spring and a fourth driving device for driving the pull rod to move axially, the supporting block is fixed on the X-direction sliding plate, the pull rod passes through the T-shaped block and the supporting block, and an end of the pull rod is provided with a first radial protrusion capable of pulling the T-shaped block; the spring is arranged between the T-shaped block and the supporting block, the pull rod is sleeved with the disc spring, and the disc spring and the T-shaped block are respectively positioned on an outer side and an inner side of the supporting block; and the pull rod is provided with a second radial protrusion which limits the disc spring on the pull rod, two ends of the disc spring abut against the supporting block and the second radial protrusion respectively, and the back of the workbench is provided with a T-shaped locking groove matched with the T-shaped block.

Further, the Y-direction sliding plate is arranged on one side of the column, and a tool changer is arranged on the other side of the column; a side surface of the column is provided with a first Y-direction lead screw, a second Y-direction lead screw, and a first Y-direction driving motor and a second Y-direction driving motor which drive the first Y-direction lead screw and the second Y-direction lead screw respectively; and the Y-direction sliding plate is mounted on the first Y-direction lead screw and the second Y-direction lead screw, two Z-direction sliding rails are arranged on the Y-direction sliding plate, two sides of the Z-direction ram are mounted on the Z-direction sliding rails through Z-direction sliding blocks, and the milling head is an A/B angle milling head.

Compared with the prior art, the horizontal five-axis turning plate type machining center of the invention has the following advantages:

1. The turning plate device is arranged to realize the horizontal and vertical position conversion of the turning plate, so that a workpiece is mounted and dismounted when the turning plate is in a horizontal state, and the workbench is transported to the lathe bed for workpiece machining when the turning plate is in a vertical state, thus improving the loading and unloading efficiency.
2. By adopting double lead screws and double slideways, a spindle has good rigidity, and is particularly suitable for high-efficiency and high-precision machining of aluminum alloy aeroengine parts and cylindrical parts.
3. By adopting the A/B angle milling head and a reasonable whole structure configuration, the machining accuracy and efficiency are guaranteed.

DETAILED DESCRIPTION OF THE INVENTION

As shown in FIGS. 1-15, a horizontal five-axis turning plate type machining center comprises a support base 1, a lathe bed 2 arranged on the support base 1 and a column 3 arranged on the support base 1, wherein the lathe bed 2 and the column 3 are fixedly connected through a connecting arm 4, the support base 1 is provided with a turning plate device 5 which comprises a turning plate 7 having a lower part hinged to the support base 1 through a first hinge 6 and a first driving unit capable of driving the turning plate 7 to turn over, and an X-direction sliding plate 8 capable of sliding in an X direction on the lathe bed 2 and a second driving unit capable of driving the X-direction sliding plate 8 to slide are arranged on a side, facing the column 3, of the lathe bed 2; and a third driving unit capable of driving a workbench 9 to perform position conversion between the turning plate 7 and the X-direction sliding plate 8 is arranged on the turning plate 7, the X-direction sliding plate 8 is provided with a locking mechanism capable of locking the workbench 9, the column 3 is provided with a Y-direction sliding plate 10, the Y-direction sliding plate 10 is provided with a Z-direction ram 11, and the Z-direction ram 11 is provided with a milling head 12.

The lower part of the turning plate 7 is provided with a first supporting slideway 13, a lower part of the X-direction sliding plate 8 is provided with a second supporting slideway 14, a lower part of a back of the workbench 9 is provided with sliding rollers 15 capable of sliding on the first supporting slideway 13 and the second supporting slideway 14, the first supporting slideway 13 and the second supporting slideway 14 are arranged coaxially, and an upper part of the workbench 9 is provided with a limiting chute 16; and an upper part of the turning plate 7 is provided with a first limiting roller 17, the first limiting roller 17 is capable of entering the limiting chute 16 and sliding relative to the limiting chute 16, and limiting the workbench 9 on the turning plate 7, and an upper part of the X-direction sliding plate 8 is provided with a second limiting roller 18 capable of entering the limiting chute 16 and sliding relative to the limiting chute 16, and limiting the workbench 9 on the X-direction sliding plate 8.

Figure 1:
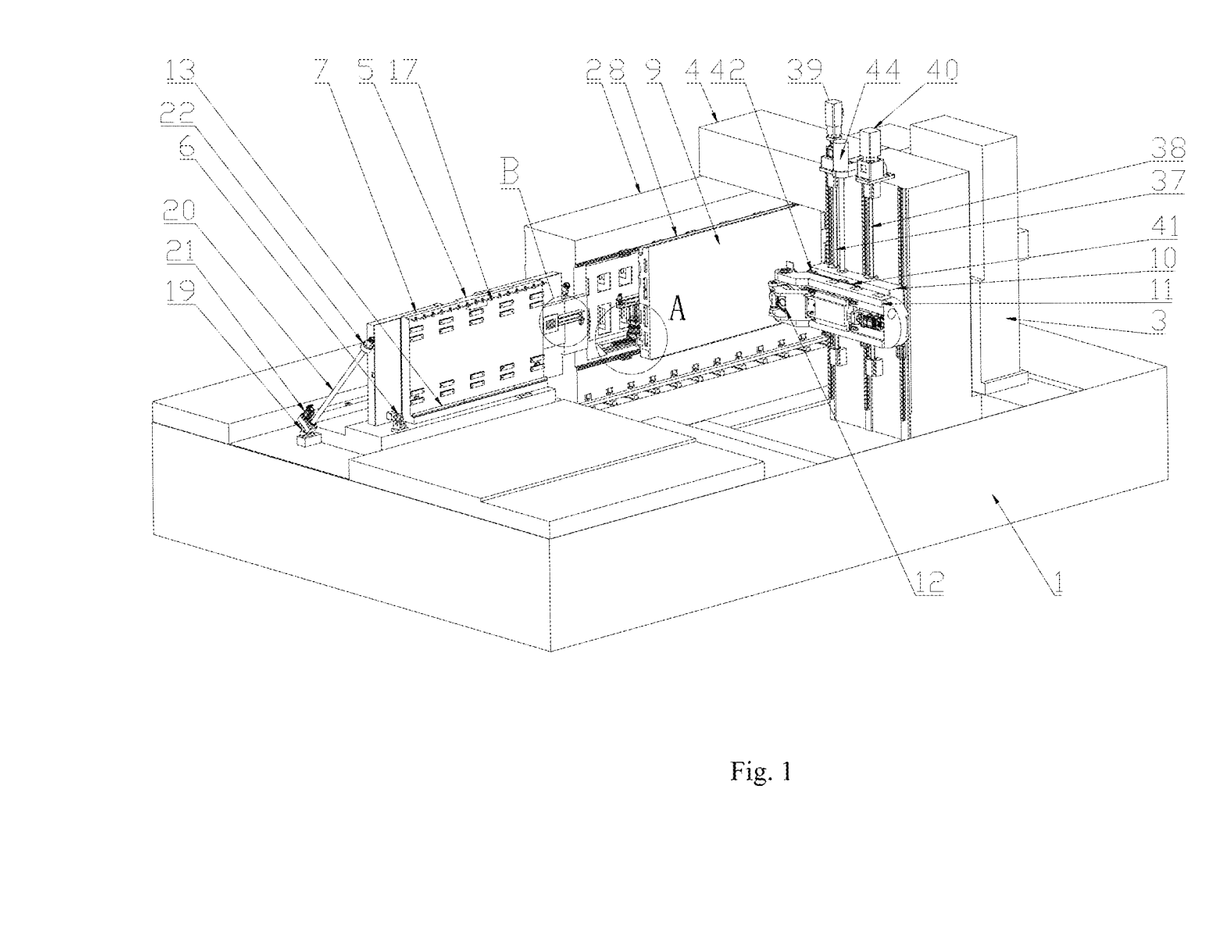
FIG. 1 is a structural diagram of an embodiment of the invention.

The first driving unit comprises a turning plate lead screw 20 hinged to the support base 1 through a second hinge 19 and a turning plate driving motor 21 for driving the turning plate lead screw 20 to rotate, and a lead screw nut 22 matched with the turning plate lead screw 20 is arranged on an end face of the turning plate 7. In this embodiment, in order to ensure the stability of the overturning action, upper ends of two end faces of the turning plate 7 are each provided with a lead screw nut, and two ends of the turning plate 7 are correspondingly provided with two turning plate lead screws.

Figure 2:
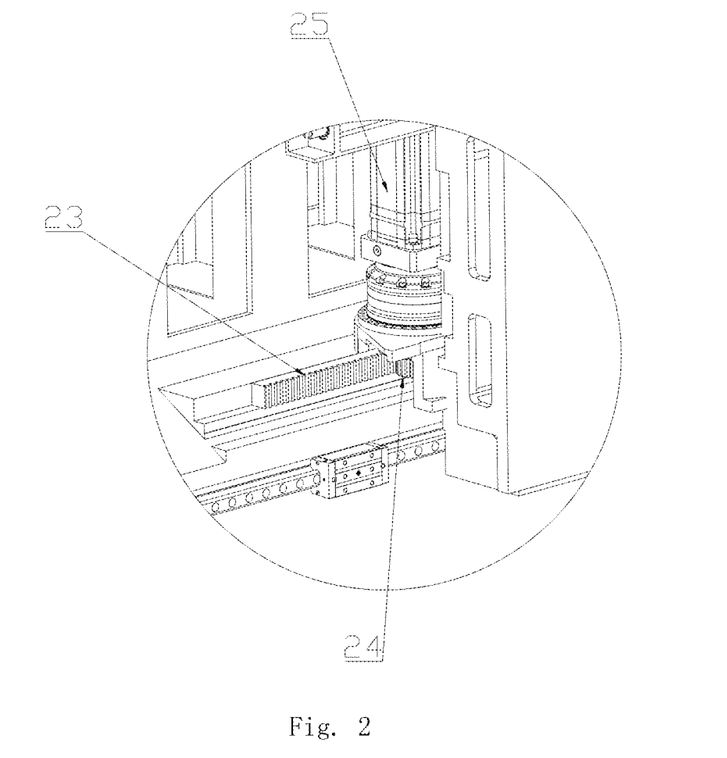
FIG. 2 is an enlarged view of part A in FIG. 1.
Figure 3:
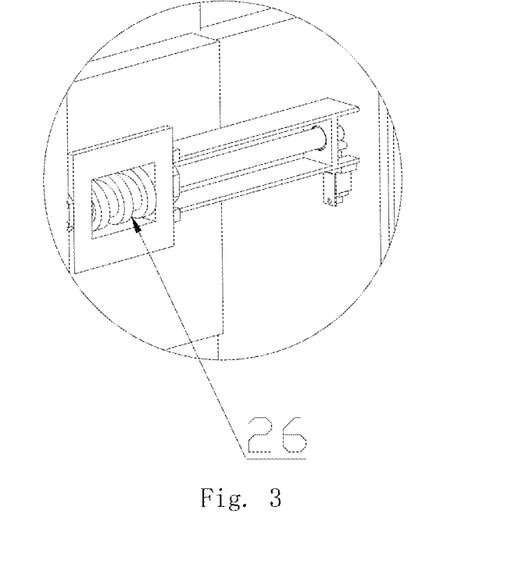
FIG. 3 is an enlarged view part B in FIG. 1.
Figure 4:
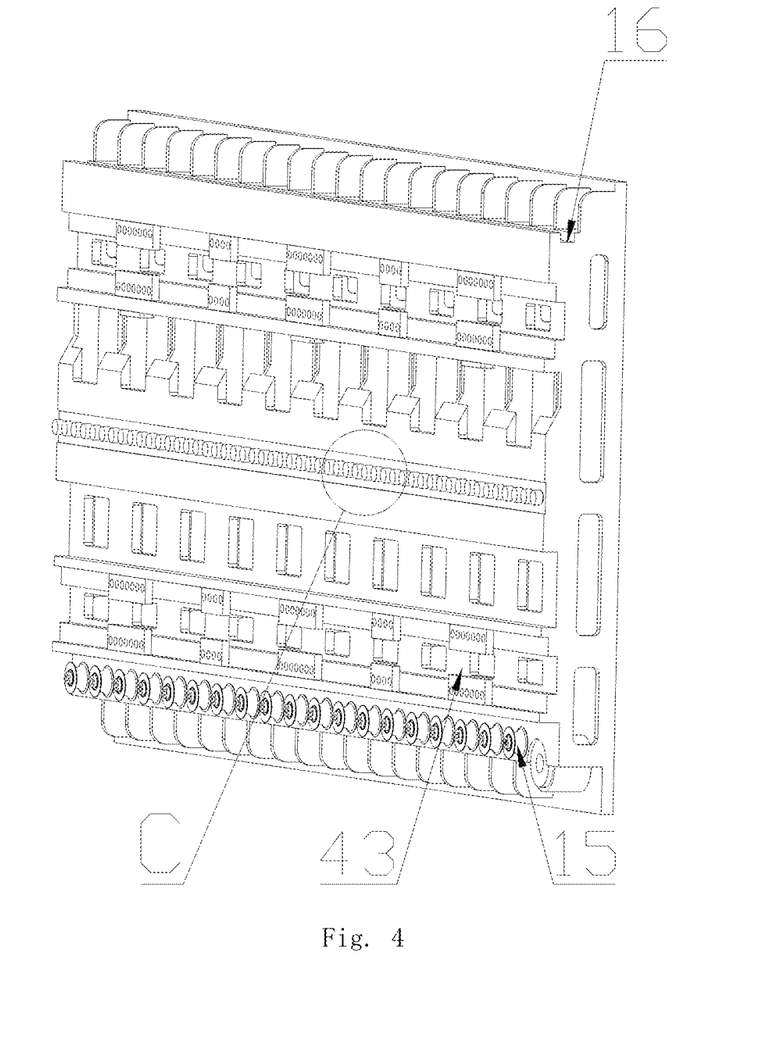
FIG. 4 is a three-dimensional structural diagram of a workbench according to an embodiment of the invention.
Figure 5:
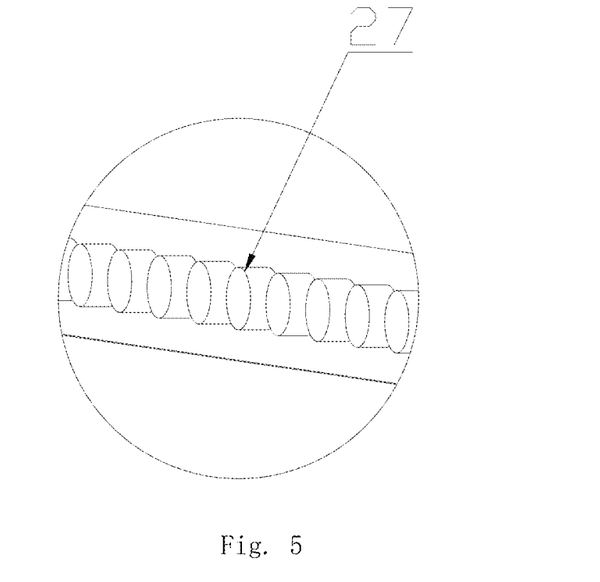
FIG. 5 is an enlarged view of part C in FIG. 4.
Figure 6:
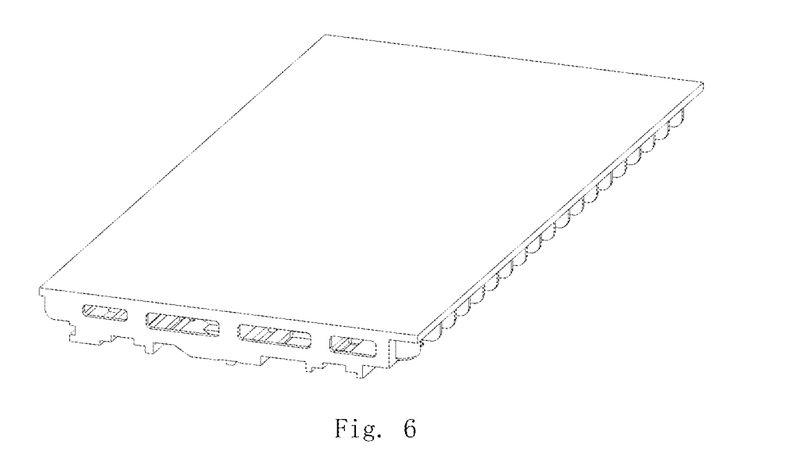
FIG. 6 is a three-dimensional structural diagram of a workbench according to an embodiment of the invention from another angle.
Figure 7:
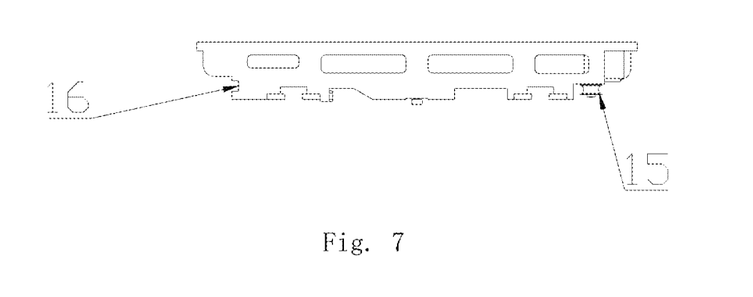
FIG. 7 is a side view of a workbench according to an embodiment of the invention.
Figure 8:
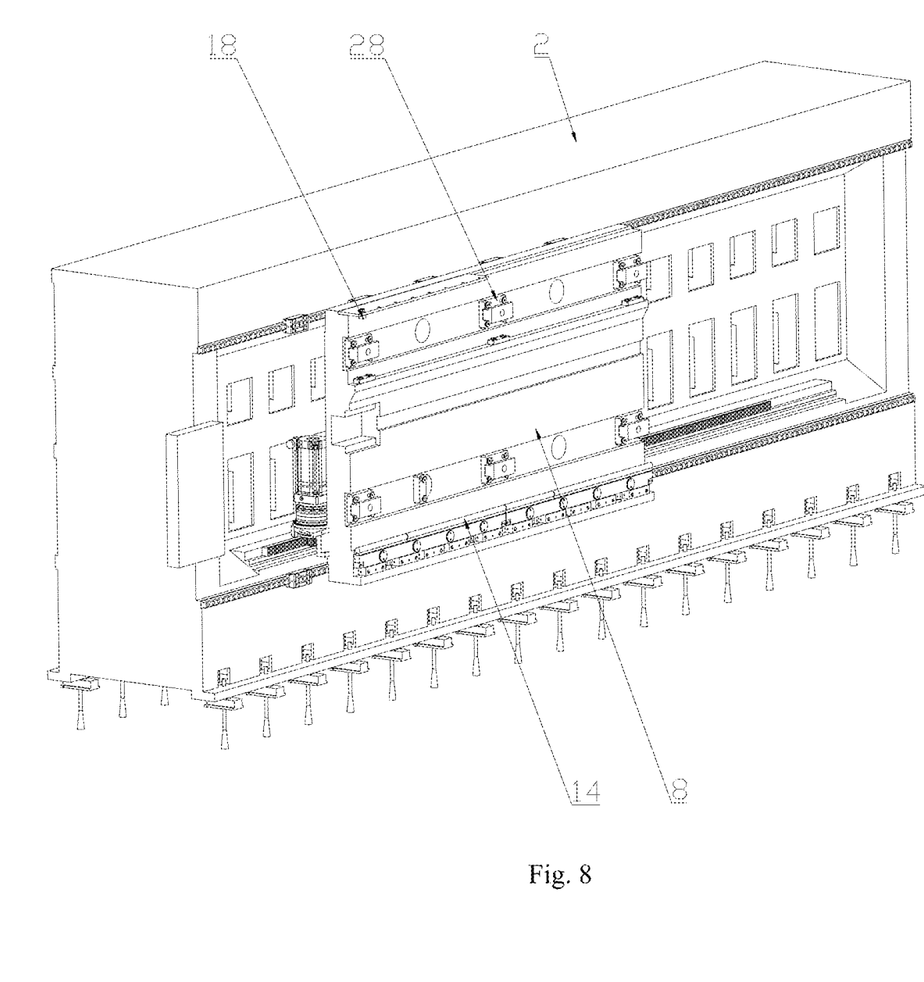
FIG. 8 is a structural diagram of a lathe bed and an X-direction sliding plate according to an embodiment of the invention.
Figure 9:
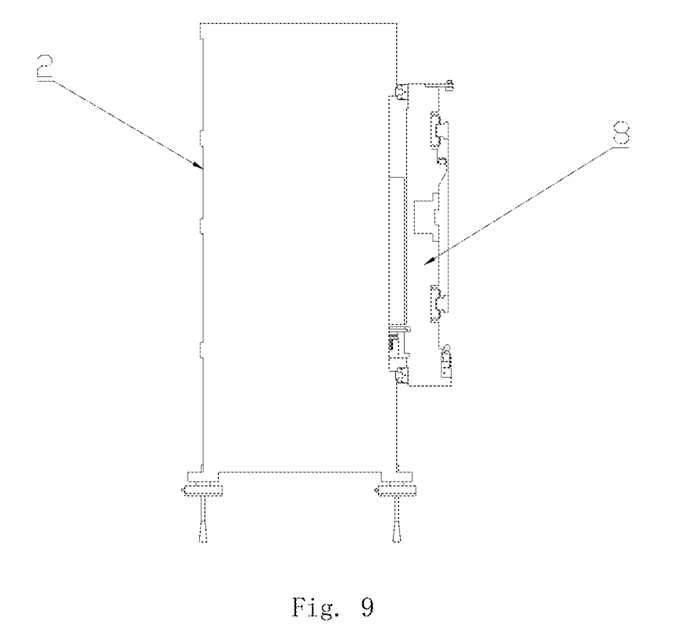
FIG. 9 is a side view of a lathe bed and an X-direction sliding plate according to an embodiment of the invention.
Figure 10:
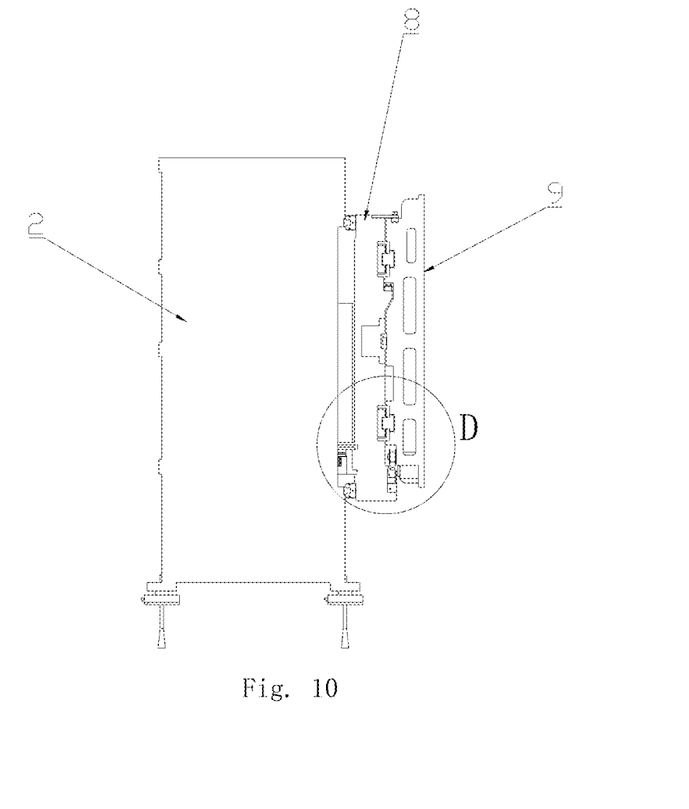
FIG. 10 is a side view of a lathe bed, an X-direction sliding plate and a workbench according to an embodiment of the invention.

The second driving unit comprises a rack 23 fixed on the lathe bed in the X direction, a gear 24 mounted on the X-direction sliding plate 8 and a gear motor 25 for driving the gear 24, and the gear 24 meshes with the rack 23, as shown in FIG. 2.

Figure 12:
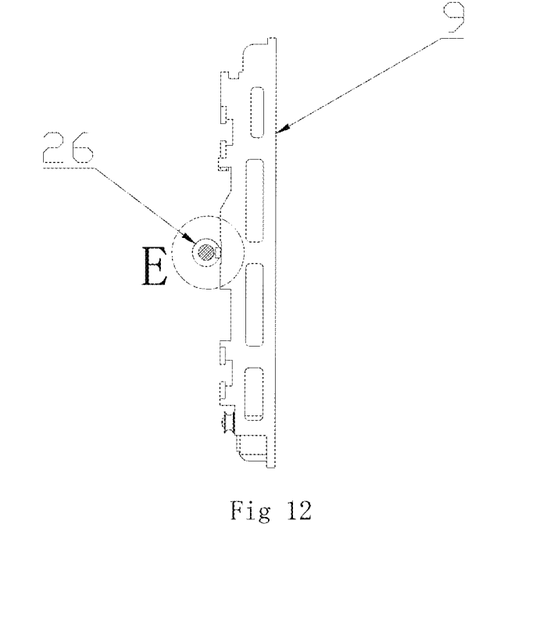
FIG. 12 is a diagram of a cooperation relationship between a worm and a workbench according to an embodiment of the invention.
Figure 13:
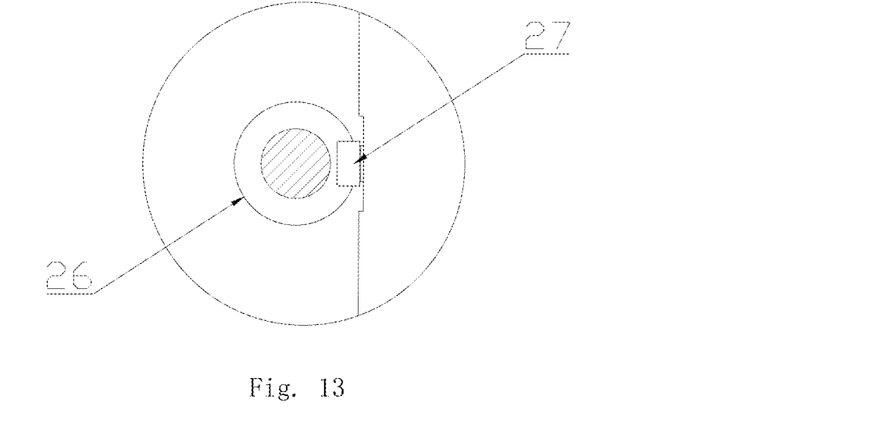
FIG. 13 is an enlarged view of part E in FIG. 12.

The third driving unit comprises a worm 26 and a motor for driving the worm, and the specific driving mode may be coaxial driving or gear driving. An axial direction of the worm 26 is arranged in the X direction, pin rollers 27 are arranged on the back of the workbench 9 in the X direction at intervals, the pin rollers are matched with the worm 26, and a spiral structure of the worm is matched with the pin rollers 27 in an alternate mode to form a meshing-like structure, so that when the worm 26 rotates, the pin rollers 27 are pushed to move so as to drive the workbench 9 to move, as shown in FIGS. 12 and 13.

Figure 11:
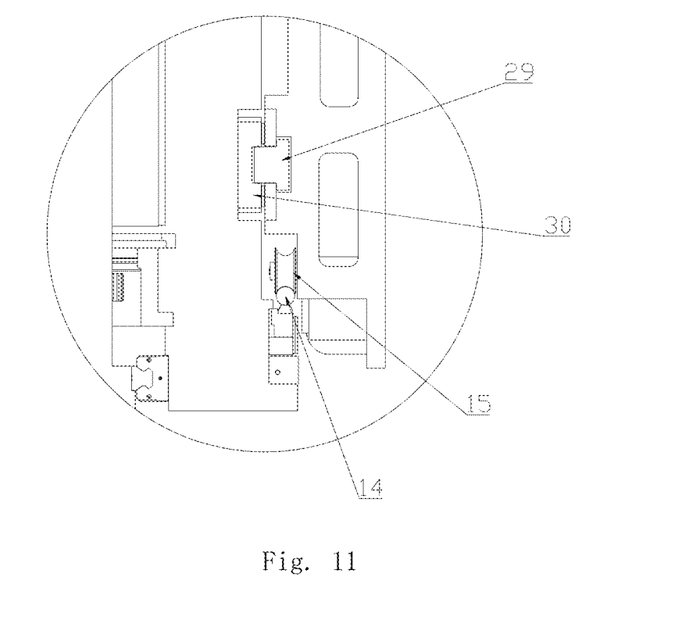
FIG. 11 is an enlarged view of part D in FIG. 10.
Figure 14:
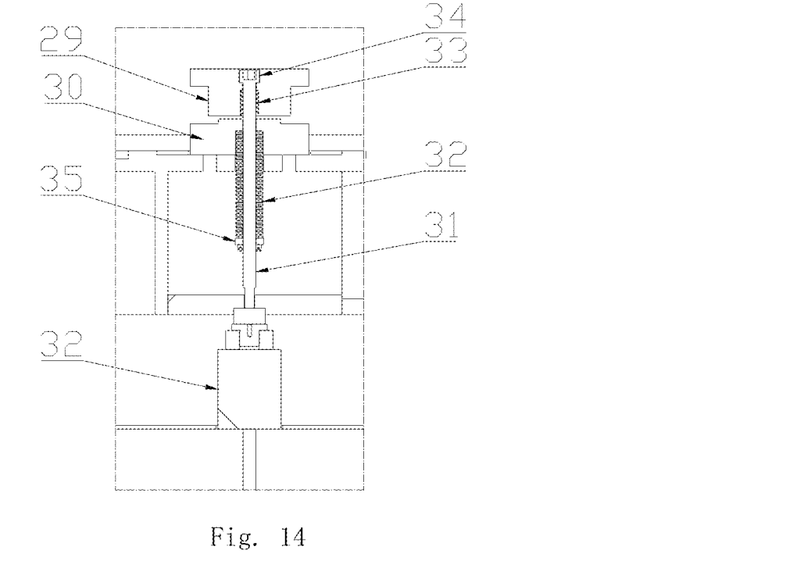
FIG. 14 is a structural diagram of a locking mechanism according to an embodiment of the invention.

As shown in FIGS. 11 and 14, the locking mechanism 28 comprises a T-shaped block 29, a supporting block 30, a pull rod 31, a disc spring 32, a spring 33 and a fourth driving device 32 for driving the pull rod 31 to move axially, the supporting block 30 is fixed on the X-direction sliding plate 8, the pull rod 31 passes through the T-shaped block 29 and the supporting block 30, and an end of the pull rod 31 is provided with a first radial protrusion 34 capable of pulling the T-shaped block 29; the spring 33 is arranged between the T-shaped block 29 and the supporting block 30, the pull rod 31 is sleeved with the disc spring 32, and the disc spring 32 and the T-shaped block 29 are respectively positioned on an outer side and an inner side of the supporting block 30; and the pull rod 31 is provided with a second radial protrusion 35 which limits the disc spring 32 on the pull rod 31, two ends of the disc spring 32 abut against the supporting block 30 and the second radial protrusion 35 respectively, and the back of the workbench 9 is provided with a T-shaped locking groove 43 matched with the T-shaped block 29. In an unlocked state, the fourth driving device 32 pushes the pull rod 31, the second radial protrusion 35 compresses the disc spring 32, and the T-shaped block 29 moves away from the supporting block 30 under the elastic force of the spring 33, creating a gap between the T-shaped block 29 and the supporting block 30, so that the T-shaped block 29 enters the T-shaped locking groove 43 when the workbench 9 slides to the X-shaped sliding plate 8; and the fourth driving device 32 stops pushing the pull rod 31, the disc spring 32 expands and restores from a compressed state, the pull rod 31 is pulled by the second radial protrusion 35, the pull rod 31 pulls the T-shaped block 29 to move towards the supporting block 30 through the first radial protrusion 34 and locks the T-shaped block 29, and then the T-shaped block 29 locks the workbench 9 on the X-direction sliding plate 8. The fourth driving device adopted in this embodiment may be an oil cylinder or a cam structure driven by a stepping motor, as long as the pull rod 31 can be pushed.

Figure 15:
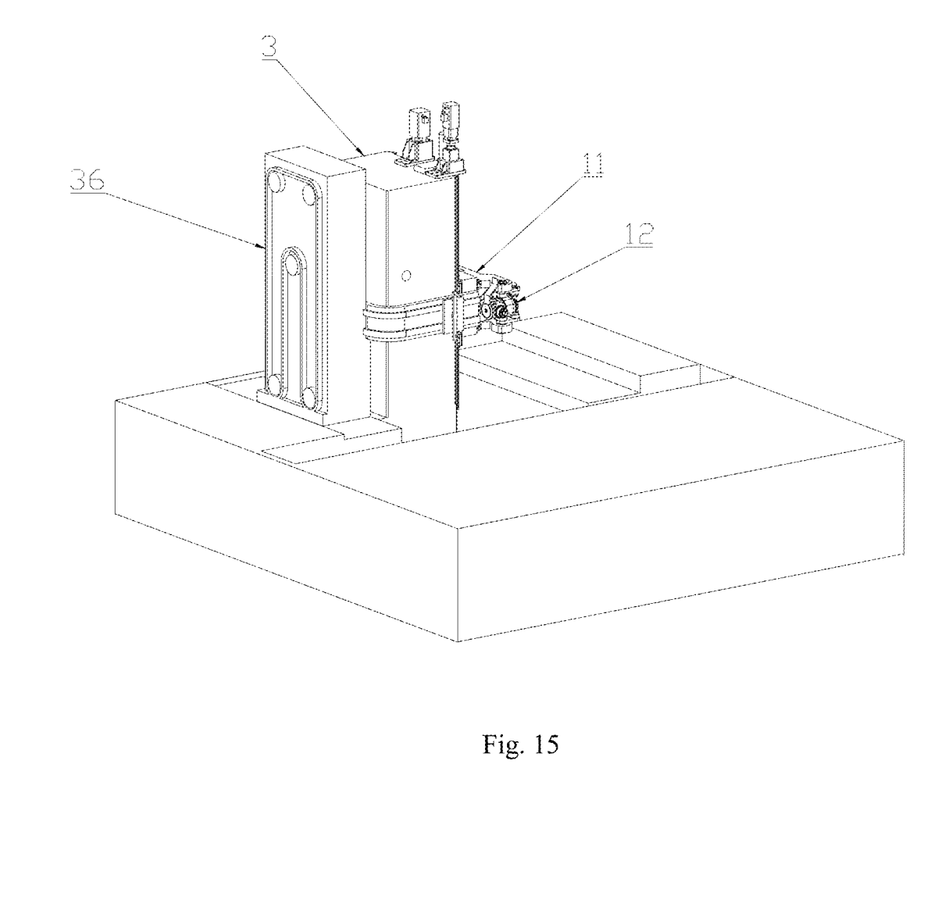
FIG. 15 is a three-dimensional structural diagram of a column according to an embodiment of the invention from another angle.

The Y-direction sliding plate 10 is arranged on one side of the column 3, and a tool changer 36 is arranged on the other side of the column, as shown in FIG. 15. In this embodiment, a spindle box is hung on a left side of the column, the tool changer is arranged on a right side of the column, and a tool is changed by moving a manipulator. A side surface of the column 3 is provided with a first Y-direction lead screw 37, a second Y-direction lead screw 38, and a first Y-direction driving motor 39 and a second Y-direction driving motor 40 which drive the first Y-direction lead screw 37 and the second Y-direction lead screw 38 respectively; and the Y-direction sliding plate 10 is mounted on the first Y-direction lead screw 37 and the second Y-direction lead screw 38, two Z-direction sliding rails 41 are arranged on the Y-direction sliding plate 10, two sides of the Z-direction sliding ram 11 are mounted on the Z-direction sliding rails 41 through Z-direction sliding blocks 42, and the milling head 12 is an A/B angle milling head, specifically a connecting rod A/B angle milling head. The column 3 is also provided with a balancing cylinder 44 for balancing the Y-direction sliding plate 10. In this embodiment, the spindle moves around an X axis to realize A-axis movement, and the whole structure is simple. The spindle has good rigidity, and is particularly suitable for high-efficiency and high-precision machining of aluminum alloy aeroengine parts and cylindrical parts, and the requirement of China's aerospace industry for equipment for high-efficiency and high-precision machining of aluminum alloy parts is met.

The X-direction, Y-direction and Z-direction mentioned in the invention are common terms for the direction of machine tools in this field, which are intended to distinguish the movement and arrangement direction relationship between components, but are not taken as the limit of the absolute direction of each component.

The working process of this embodiment is as follows:

Loading: a working position of the turning plate 7 faces upwards, the workbench 9 is positioned on the turning plate 7, and a worker clamps a part to be machined;

Turning over the turning plate: after the workpiece is clamped, the first driving unit drives the turning plate 7 to rotate and rise to a vertical position, to be parallel to the X-direction sliding plate 8 on the lathe bed 2;

Moving the workbench onto the lathe bed: the worm 26 of the third driving unit drives the workbench 9 to the lathe bed, the sliding rollers 15 roll from the first supporting slideway 13 to the second supporting slideway 14, and the locking mechanism locks the workbench 9 on the X-direction sliding plate 8 to machine the part; and Removing the machined part from the machine tool: after machining is completed, the workbench 9 is driven by the third driving unit to return to the turning plate 7, the first driving unit drives the turning plate 7 to rotate to a horizontal position, and the worker dismounts the part, so that the next round is started.

The above embodiments are only preferred ones of the invention, but do not limit the scope of the invention. On the premise of not departing from the design spirit of the invention, various modifications and improvements made by those of ordinary skill in the art to the technical solution of the invention shall fall within the protection scope determined by the claims of the invention.

What is claimed is:

1. A horizontal five-axis turning plate type machining center, comprising: a support base, a machine bed arranged on the support base and a column arranged on the support base, wherein the machine bed and the column are fixedly connected through a connecting arm, the support base is provided with a turning plate device which comprises a turning plate having a lower part hinged to the support base and a first driving unit capable of driving the turning plate to pivot between a vertical orientation and a horizontal position, and an X-direction sliding plate capable of sliding in an X direction on the machine bed and a second driving unit capable of driving the X-direction sliding plate to slide are arranged on a side, toward the column, of the machine bed; and a third driving unit capable of driving a workbench to move between being attached to the turning plate and the X-direction sliding plate is arranged on the turning plate, the X-direction sliding plate is provided with a locking mechanism capable of locking the workbench, the column is provided with a Y-direction sliding plate, the Y-direction sliding plate is provided with a Z-direction ram, and the Z-direction ram is provided with a milling head;

wherein the lower part of the turning plate is provided with a first supporting slideway, a lower part of the X-direction sliding plate is provided with a second supporting slideway, a lower part of a back of the workbench is provided with sliding rollers capable of sliding on the first supporting slideway and the second supporting slideway, and an upper part of the workbench is provided with a limiting chute; and an upper part of the turning plate is provided with a first limiting roller, the first limiting roller is capable of entering the limiting chute and sliding relative to the limiting chute, and limiting the workbench on the turning plate, and an upper part of the X-direction sliding plate is provided with a second limiting roller capable of entering the limiting chute and sliding relative to the limiting chute, and limiting the workbench on the X-direction sliding plate.

2. The horizontal five-axis turning plate type machining center according to claim 1, wherein the first driving unit comprises a turning plate lead screw hinged to the support base and a turning plate driving motor for driving the turning plate lead screw to rotate, and a lead screw nut matched with the turning plate lead screw is arranged on an end face of the turning plate.

3. The horizontal five-axis turning plate type machining center according to claim 2, wherein the second driving unit comprises a rack fixed on the machine bed in the X direction, a gear mounted on the X-direction sliding plate and a motor for driving the gear, wherein the gear meshes with the rack.

4. The horizontal five-axis turning plate type machining center according to claim 3, wherein the third driving unit comprises a worm and a motor for driving the worm, an axial direction of the worm is arranged in the X direction, pin rollers are arranged on the back of the workbench in the X direction at intervals, and the pin rollers are matched with the worm, so that when the worm rotates, the pin rollers are pushed to move so as to drive the workbench to move.

5. The horizontal five-axis turning plate type machining center according to claim 4, wherein the locking mechanism comprises a T-shaped block, a supporting block, a pull rod, a disc spring, a spring and a fourth driving device for driving the pull rod to move axially, the supporting block is fixed on the X-direction sliding plate, the pull rod passes through the T-shaped block and the supporting block, and an end of the pull rod is provided with a first radial protrusion capable of pulling the T-shaped block; the spring is arranged between the T-shaped block and the supporting block, the pull rod is sleeved with the disc spring, and the disc spring and the T-shaped block are respectively positioned on an outer side and an inner side of the supporting block; and the pull rod is provided with a second radial protrusion which limits the disc spring on the pull rod, two ends of the disc spring abut against the supporting block and the second radial protrusion respectively, and the back of the workbench is provided with a T-shaped locking groove matched with the T-shaped block.

6. The horizontal five-axis turning plate type machining center according to claim 1, wherein the Y-direction sliding plate is arranged on one side of the column, and a tool changer is arranged on another side of the column; a side surface of the column is provided with a first Y-direction lead screw, a second Y-direction lead screw, and a first Y-direction driving motor and a second Y-direction driving motor which drive the first Y-direction lead screw and the second Y-direction lead screw respectively; and the Y-direction sliding plate is mounted on the first Y-direction lead screw and the second Y-direction lead screw, two Z-direction sliding rails are arranged on the Y-direction sliding plate, two sides of the Z-direction ram are mounted on the Z-direction sliding rails through Z-direction sliding blocks.

* * * * *